United States Patent [19]

Kokaly

[11] 3,967,532

[45] July 6, 1976

[54] FORWARD-REVERSE VALVE FOR ELEVATING SCRAPER DRIVE

[75] Inventor: Joseph Kokaly, Buckeye, Ariz.

[73] Assignee: Caterpillar Tractor Co., Peoria, Ill.

[22] Filed: Jan. 7, 1974

[21] Appl. No.: 431,384

[52] U.S. Cl.................................. 91/420; 91/441; 137/596.2
[51] Int. Cl.².................. F15B 11/08; F15B 13/042
[58] Field of Search.......................... 91/420, 441, 6; 137/596.14, 596.15, 596.18, 596.2, 106

[56] References Cited
UNITED STATES PATENTS

| | | | |
|---|---|---|---|
| 2,328,980 | 9/1943 | Herman et al. | 91/420 |
| 2,517,164 | 8/1950 | Arps | 91/420 X |
| 2,618,121 | 11/1952 | Tucker | 91/420 |
| 3,184,920 | 5/1965 | Lohbauer et al. | 91/420 X |
| 3,213,874 | 10/1965 | Schmiel et al. | 91/420 X |
| 3,349,671 | 10/1967 | Hoffman | 91/420 |
| 3,735,670 | 5/1973 | Smithson | 91/420 X |
| 3,814,413 | 6/1974 | Bopp | 91/420 |

FOREIGN PATENTS OR APPLICATIONS

| | | | |
|---|---|---|---|
| 753,866 | 8/1956 | United Kingdom | 91/420 |

*Primary Examiner*—Irwin C. Cohen
*Attorney, Agent, or Firm*—Phillips, Moore, Weissenberger Lempio & Strabala

[57] ABSTRACT

There is disclosed a valve assembly in combination with a hydraulic circuit to operate a motor in the circuit in a forward and reverse direction. The valve assembly includes check valve means for regulating fluid flow to the motor, pilot valve means for operating the check valve means responsive to pressures within the circuit, and relief valve means for relieving overpressure within the circuit. The combination is constructed and arranged so that the valve assembly substantially prevents cavitation of the motor, and is also operative to and isolate the motor from external loading.

5 Claims, 1 Drawing Figure

U.S. Patent    July 6, 1976    3,967,532
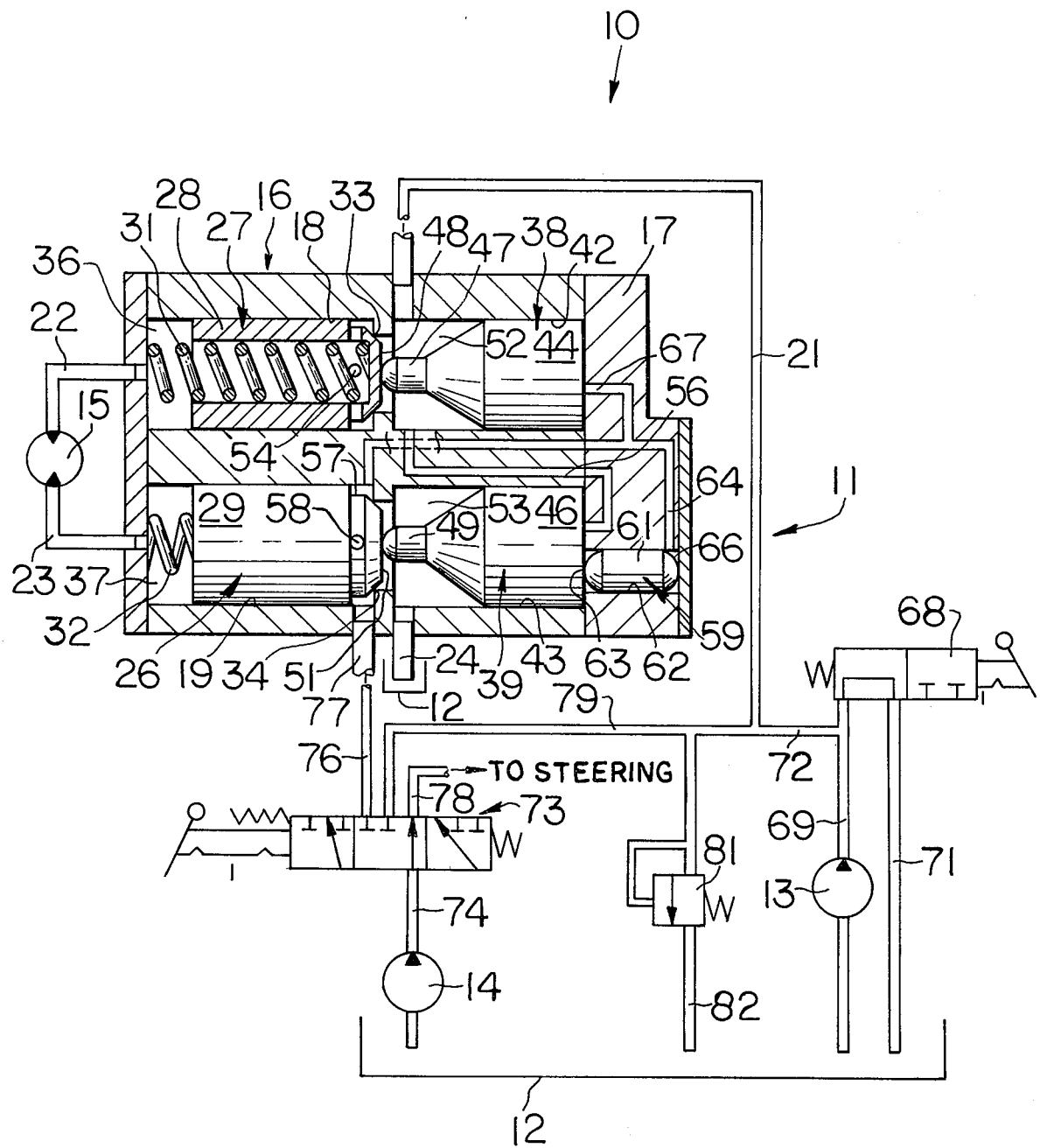

3,967,532

FORWARD-REVERSE VALVE FOR ELEVATING SCRAPER DRIVE

BACKGROUND OF THE INVENTION

This invention relates to a valve assembly for a hydraulic system. In particular, the invention relates to a valve assembly for a hydraulic system of the type having a fluid flow circuit including a fluid supply source, a motor, and a pump for circulating fluid in a forward or reverse direction to thereby operate the motor in a forward or reverse direction.

Various hydraulic systems incorporate valving and circuitry to control the forward-reverse operation of hydraulic motors. When such motors are used for example, as the elevator drive of self-loading earthmoving scrapers it is desirable to isolate motor operation from external forces that tend to rotate the motor. In order to obtain optimum operation, it is also desirable to provide a make-up valve in the system to prevent cavitation of the motor due to overrunning, such as frequently occurs with the valves in neutral position and external loading of the motor.

Frequently, prior art attempts to provide a workable forward and reverse fluid flow to the motor in such hydraulic systems have failed to include means for isolating the motor from external forces and means for preventing cavitation of the motor. Further, many such prior art attempts have resullted in cumbersome hydraulic circuitry and additional valve components, all of which increase the overall cost of the control system.

Exemplary of such prior art systems are those described in U.S. Pat. Nos. 3,164,171; 3,198,099 and 3,411,521.

SUMMARY AND OBJECTIVES OF THE INVENTION

Accordingly, the invention provides a valve assembly for a hydraulic system of the type having a fluid flow circuit including a fluid supply source, a motor, and a pump for circulating fluid from the fluid supply source through the circuit in a forward or reverse direction to thereby operate the motor check valve means for regulating fluid flow to the motor responsive to accumulated pressures within the fluid circuit, pilot means for operating the check valve means in response to accumulated fluid pressure within the fluid circuit, and relief valve means for relieving the circuit of accumulated overpressures. The valve assembly further performs a lock valve function to isolate the motor from external loads, thereby preventing operation of the motor from external forces, and a make-up valve function to prevent cavitation of the motor.

It is therefore an object of the invention to provide a valve assembly for a hydraulic system which effectively regulates forward and reverse fluid flow through a motor in a fluid flow circuit.

It is another object of this invention to provide a valve assembly for a hydraulic system which is simple and economical.

It is an additional object of this invention to provide a valve assembly for a hydraulic system which effectively regulates forward and reverse fluid flow through a motor in a fluid circuit, and further includes means for preventing cavitation of the motor and means for isolating the motor from external loads.

It is a further object of this invention to provide a simple hydraulic system including a simple, effective valve assembly which includes means for regulating fluid flow in a forward or reverse direction, and includes means for relieving accumulated overpressures in the system.

BRIEF DESCRIPTION OF THE DRAWINGS

The sole FIGURE is a schematic view of a hydraulic system including the valve assembly of this invention.

DETAILED DESCRIPTION OF THE DRAWING

The FIGURE illustrates a hydraulic system generally indicated at 10 including a fluid flow circuit 11, and a suitable fluid supply source including a tank 12, and pumps 13, and 14 for supplying fluid through the circuit 11 to operate a motor 15 in a forward or reverse direction. The motor 15 drives, for example, the elevator of a self-loading machine such as an elevating scraper (not shown). The fluid flow circuit 11 includes a directional control valve and a check valve assembly 16 having a valve housing 17 provided with a first bore 18 and a second bore 19 disposed within the valve housing so that fluid flowing in a forward direction from the tank 12 serially flows from the tank 12, through a conduit 21 to the first bore 18, through the first bore 18 to the motor 15 via a conduit 22, through the motor 15 to the second bore 19 via a conduit 23, and from the second bore 19 to the tank 12 via a conduit 24. A first check valve means 27 and a second check valve means 26 are respectively disposed within said first and second bores 18 and 19 for regulating fluid flow between the source and the motor 15. The check valve means 26 and 27 comprise valve member hereinafter referred to as plunger 28 and 29 respectively, reciprocable within the bores 18 and 19 in response to fluid pressure levels within the circuit 11. The check valve means 26 and 27 are maintained in closed position, as illustrated, by springs 31 and 32 urging the valve plunger against their respective valve seats 33 and 34.

The bores 18 and 19 respectively include first and 2nd valve plunger chambers 36 and 37.

The valve assembly 16 is further provided with pilot means 38 and 39 respectively disposed within a third bore 42 and a fourth bore 43 in the valve housing 17 coaxial with said first and second bores, for pilot operation of the check valve means 26 and 27 in response to fluid pressures accumulated within the circuit 11. The pilot valve means 38 and 39 comprise piston means 44 and 46 mounted for reciprocation within their respective bores. A neck-down portion 47 of piston means 44 towards the valve plunger 28, thereby unseating the plunger 28 and opening the check valve means 27. Similarly, a neck-down portion 49 of the piston means 46 abuts a forward portion 51 of the valve plunger 29 so that opening of the pilot means 39 from the closed position shown shifts the piston means 46 toward the valve plunger 29, thereby unseating the valve plunger 29 and opening the check valve means 26. The third and fourth bores 42 and 43 include piston chambers 52 and 53 respectively. Piston chamber 52 is communicate with the first valve plunger chamber 36 via a plurality of orifices 54 in the first valve plunger 36 when check valve means 27 is open, and is further in communication with the fourth bore 43 via a conduit 56. The piston chamber 53 is communicable with the second valve plunger 37 when check valve means 29 is open via a plurality of orifices 58 in the plunger 29.

The valve assembly 16 is also provided with first relief valve actuating means 59 for relieving excessively high fluid pressure within the circuit 11 during reverse flow of fluid therein. Preferably, the first relief valve actuating means 59 comprises a piston 61 disposed within a fifth bore 62 in the valve housing 17. The fifth bore 62 is in communication with the fourth bore 43 at an interface 63 so that actuation of the first relief valve actuating means 59 to move the piston 61 toward the pilot valve means 39 opens the pilot valve means 39, which in turn opens the check valve means 26. The piston 61 is moved toward the pilot means 39 by excessive fluid pressure accumulated in a conduit 64 communicating with a chamber 66 rightward of the piston 61. The conduit 64 also communicates with the chamber 57 in the second bore 19, and with a conduit 67 which in turn communicates with the third bore 42.

The hydraulic system 10 further includes first control valve means 68 for controlling the flow of fluid drawn from the tank 12 by the pump 13, and second control valve means 73 for controlling the flow of fluid drawn from the tank 12 by the pump 14. In the rightward position shown, the first control valve means 68 directs the output of the pump 13 through a conduit 69 and returns it to the tank 12 via a conduit 71. Movement of the first control valve means 68 leftward from the position shown blocks the conduit 71 and directs fluid from the pump 13 to the conduit 21 of the circuit 11 via a conduit 72. In the spring-centered position shown, the second control valve means 73 blocks the output of the pump 14 to the circuit 11. Movement of the second control valve means 73, rightward from the position shown directs fluid from the pump 14 to the conduit 21 of the circuit 11 via a conduit 79. In the spring-centered position shown, the second control valve means 73 blocks the output of the pump 14 to the circuit 11. Movement of the second control valve means 73, leftward from the position shown directs fluid drawn from the tank 12 by the pump 14 to the circuit 11 via conduits 74, 76 and 77. Preferably, the second control valve means 73 is a diverter-type valve as shown which normally diverts the output of the pump 14 to other circuitry, such as the steering valve and associated circuitry. In the spring-centered position shown, the second control valve means 73 diverts the output of the pump 14 to the steering circuit via a conduit 78. If it is desired to increase fluid flow in the circuit 11 during operation of the pump 13, the second control valve means 73 is shifted rightwardly from the position shown, thereby adding fluid drawn from the tank 12 by the pump 14 to the circuit 11 via conduits 74 and 79.

Preferably, the circuit 11 is protected from overpressures by second relief valve means 81 communicating with the tank 12 via a conduit 82. Excessively high pressures in the conduit 21 open the relief valve means 81, permitting fluid to flow from the circuit 11 to the tank 12.

The system 10 operates in the following manner:

Forward fluid flow is obtained within the circuit 11 by, for example, shifting control valve means 68 to the left from the position shown. The pump 13 draws fluid from the tank 12 and pumps the fluid in a forward direction to the housing 17 via the conduits 69, 72 and 21. The forwardly directed fluid enters a chamber 52 within the third bore 42, and flows from the chamber 52 to the motor 15 via the conduit 22 when sufficient pressure is accumulated within the chamber 52 to open the first check valve means 27. Fluid flows through the first check valve means 27 via the orifices 54 in the valve plunger 28 communicating between the chamber 52 and the first valve plunger chamber 36 when the first check valve means 27 is open. The forwardly directed fluid then flows through the motor 15, operating it in a forward direction, and is then exhausted to the second valve plunger chamber 37 through the conduit 23. Simultaneously, accumulated fluid pressure in the chamber 52 is translated to the pilot means 39 via the conduit 56 communicating between the chamber 52 and the fourth bore 43. The pilot means 39 responds to the accumulated fluid pressure in the chamber 52, shifting the piston means 46 toward the valve spool 29, thereby unseating the valve spool 29 and opening the check valve means 26. The fluid in the second valve plunger chamber 37 exhausted from the motor 15 is then permitted to flow from the chamber 37 to the chamber in the fourth bore 53 through the valve spool 29 via the orifices 58. The forwardly directed fluid then flows from the chamber 53 to the tank 12 via the conduit 24.

If it is desirable to operate the motor 15 in a forward direction faster than possible by means of the output of the pump 13, the second control valve means 73 are positioned to communicate the output of the second pump 14 to the conduit 21 via the conduit 79; this is accomplished by shifting the control valve means 73 to the right from the spring-centered position shown.

The circuit 11 is protected from overpressures during the forward fluid flow described above by the relief valve means 81 disposed within the system 10 so that when fluid pressure in the conduit 21 reaches a predetermined level, valve means 81 opens and fluid is returned to the tank 12 via the conduit 82.

Reverse fluid flow is obtained within the circuit by shifting the control valve means 73 to the left so that the conduit 74 is communicated with the conduit 76. The pump 14 draws fluid from the tank 12 and pumps the fluid in a reverse direction to the housing 17 via the conduits 76 and 77. The reversely-directed fluid enters the chamber 57 in the second bore 19 between the valve plunger 29 and the valve seat 34, and flows from the chamber 57 into the second valve plunger chamber 27 via the orifices 58 without unseating the valve spool 29. These orifices or passages 58 are sufficient in number and size to permit normal reverse flow of fluid therethrough to the motor 15. The reversely-directed fluid flows from the chamber 37 through the motor 14 via the conduit 23 to operate the motor 15 in the reverse direction. The fluid exhausted from the motor 15 enters the first valve plunger chamber 36 via the conduit 22. Simultaneously, accumulated fluid pressure in the chamber 57 is translated to the pilot means 38 via a conduit 67 communicating between the chamber 57 and the third bore 42. The pilot means 38 opens in response to the accumulated fluid pressure in the chamber 57, shifting the piston means 44 toward the valve plunger 28, thereby unseating the valve plunger 28 and opening the check valve means 27. Fluid in the chamber 36 is then circulated to the chamber 52 via the orifices 54 in the valve spool 28, and from there to the tank 12 via the conduits 21, 72 and 71 through the control valve 68 which is in the position shown.

Overpressures in the circuit 11 developed during reverse fluid flow are relieved by the relief valve actuating means 59. Pressure existing in the chamber 57 is translated to the chamber 66 via the conduit 64, actuating the relief valve actuating means 59 to shift the piston 61 toward the piston means 46 of the pilot valve means 39. The pilot valve actuating means 39 is thus opened, shifting the piston means 46 toward the valve plunger 29, thereby unseating the valve plunger 29 and opening the second check valve means 26. The chamber 57 thus becomes in communication with the chamber 53 in the fourth bore 43, and fluid is permitted to flow from the chamber 57 through the chamber 53 to the tank 12 via the conduit 24, until the overpressure in the chamber 57 is relieved and the check valve means 26 return to the closed position.

The valve assembly 16 further performs a lock function and a make-up function in the system 10.

The lock function is performed in the following manner:

When no pressurized fluid is being directed to the assembly 16, the valve plungers 28 and 29 will be seated against their respective valve seats 33 and 34, thus isolating the motor 15 from external pressures and preventing rotation of the motor 15 due to external forces that may be acting on the implement driven by the motor 15.

Also, when the system 10 is in neutral, the relief valve means 59 are responsive to pressure build-up in the chamber 37 resulting from external loads acting on the motor 10, for example, from a self-loading machine. These loads frequently attempt to operate the motor, thus acting as a pump to pressurize fluid in the chamber 37 via the conduit 23. Under this pressure, fluid will flow from the chamber 37 to the chamber 57 via the orifices 58 and from the chamber 57 to the chamber 66 within the fifth bore 43 to actuate the relief valve means as hereinbefore described to relieve pressure within the chamber 37. The above situation will frequently prevail, for example, when the motor 15 drives the elevator of a self-loading machine, as external loading occurs when the material in the scraper bears against the elevator flights during the carry mode of operation. Rough terrain or other conditions acting on the material may cause the exertion of a considerable load on the flights of the elevator and subsequently on the motor 15.

The make-up valve function is performed by the valve assembly 16 in the following manner:

Frequently, rotation of the motor 15 due to force from external loads when one or both of the control valves 68 and 73 are in the neutral position results in cavitation of the motor. A void is thus created in the chamber 36, and the presence of this void together with back-pressure present in the chamber 52 of the third bore 42 created by resistance to flow within the conduits 21, 72, the control valve means 68 and the conduit 71, is sufficient to unseat the valve plunger 28 and open the check valve means 27. Fluid will then be drawn from the tank 12 through the conduit 71, the valve means 68, and the conduits 72 and 21 into the chamber 52, and through the orifices 54 in the unseated valve plunger 28 from the chamber 52 to the chamber 36. This will supply fluid from the chamber 36 to the motor 15 via the conduit 22 to overcome the cavitation in the motor 15. If fluid is being reversely-directed through the conduit 11 to operate the motor 15 in the reverse direction, the sudden shifting of the control valve means 73 into neutral will create a void in the second valve plunger chamber 37. This void, together with tank pressure in the chamber 53 in the fourth bore 43, is sufficient to unseat the valve plunger 29 and open the second check valve means 26, permitting sufficient fluid to flow from the tank 12 through the chamber 53 via the conduit 24 to the chamber 37 via the orifices 58. This will supply sufficient fluid to the motor 15 to overcome the cavitation.

What is claimed is:

1. In a hydraulic system comprising a fluid flow circuit having a fluid supply source including a pump and a tank, a reversible hydraulic motor, conduit means for communicating between said source and said motor, inlet control valve means for directing fluid through said conduit means in a forward or reverse direction for operating said motor in a forward or reverse direction, and exhaust valve means for communicating return fluid from said motor to said tank, the improvement comprising:

a valve housing having first and second bores therein, said valve housing being disposed in said circuit between said supply source and said motor so that forward fluid flow within said circuit is sequentially directed from said supply source, through said first bore, through said motor, and through said second bore to said tank, and so that reverse fluid flow within said circuit is sequentially directed from said fluid supply source, through said second bore, through said motor, through said first bore through said exhaust valve means and to said tank;

first pilot operated check valve means disposed within said first bore for regulating forward fluid flow from said supply source to said motor, said first check valve means opening in response to accumulated fluid pressure when fluid is flowing in a forward direction to permit fluid flow from said fluid supply source, through said first bore, to said motor, and pilot means responsive to pressure in said second bore for opening said first check valve means when fluid is flowing in a reverse direction; and, second pilot operated check valve means disposed within said second bore for regulating return fluid flow between said motor and said tank, said second check valve means including pilot means for opening said valve in response to accumulated pressure within said first bore to permit fluid flow from said motor, through said second bore, to said tank, when fluid is being supplied in said forward direction, and said second check valve means being responsive to a drop in pressure in said conduit means between said second check valve means and said motor to provide direct flow of fluid from said tank to said motor, and including relief means responsive to an excess of pressure in said conduit means between said second check valve means and said source to open said second check valve means to relieve said excess pressure to said tank via said second check valve means.

2. The invention of claim 1, wherein said first and second check valve means include reciprocable valve plungers for reciprocation within the respective bores in response to accumulated pressures within said conduit means.

3. The invention of claim 2, wherein said valve plungers include passage means for conducting fluid through said bores, said passage means comprising orifices communicating with each valve plunger chamber.

4. The invention of claim 3, wherein each of said pilot means include piston means, each of said piston means having a neck-down portion abutting one of said valve plungers so that movement of said piston means toward said valve plunger causes unseating of said valve plunger and opening said check valve means.

5. The invention of claim 4, wherein said relief means further includes a piston disposed against said piston means for said second check valve means, so that accumulated fluid overpressure in the conduit means shifts said piston toward said piston means thereby opening said pilot valve means.

* * * * *